United States Patent [19]
Bennett

[11] 4,331,041
[45] * May 25, 1982

[54] MOTION TRANSMITTING REMOTE CONTROL ASSEMBLY

[75] Inventor: William G. Bennett, Troy, Mich.

[73] Assignee: Teleflex Incorporated, Limerick, Pa.

[*] Notice: The portion of the term of this patent subsequent to Nov. 27, 1996, has been disclaimed.

[21] Appl. No.: 119,329

[22] Filed: Feb. 7, 1980

[51] Int. Cl.³ .............................................. F16C 1/22
[52] U.S. Cl. .............................. 74/501.5 R; 74/501 P; 267/151; 403/32
[58] Field of Search .............. 74/501 R, 501 P, 501.5; 188/67; 267/151, 152, 33; 24/211 R, 211 L; 403/32, 28

[56] References Cited

U.S. PATENT DOCUMENTS

| | | | |
|---|---|---|---|
| 2,322,879 | 6/1943 | Piron | 267/33 |
| 2,660,423 | 11/1953 | Roy | 267/33 X |
| 3,323,764 | 6/1967 | Johnson | 267/152 X |
| 3,427,894 | 2/1969 | Tschanz | 74/501 P |
| 3,572,159 | 3/1971 | Tschanz | 74/501 P |
| 3,662,617 | 5/1972 | Bennett et al. | 74/501 R |
| 3,710,645 | 1/1973 | Bennett | 74/501 P |
| 3,762,694 | 10/1973 | MacDonnell | 267/33 X |
| 4,175,450 | 11/1979 | Bennett | 74/501 R X |

FOREIGN PATENT DOCUMENTS 1066193 4/1967 United Kingdom ................ 267/151

*Primary Examiner*—Kenneth Dorner
*Attorney, Agent, or Firm*—McGlynn and Milton

[57] ABSTRACT

A motion transmitting remote control assembly of the type for transmitting forces along a curved path by a flexible motion transmitting core element movably supported in a flexible conduit. The assembly includes a support member adapted to be connected to a support structure (such as a bulkhead) and the conduit includes a slider member slidably disposed in a passageway extending longitudinally through the support member. The support member includes a transverse guideway in which is disposed a metal L-shaped latch member having an aperture in one leg through which the slider member extends. A coil spring reacts between the support member and the other leg of the latch member for biasing the bottom of the aperture into engagement with the slider member. The bottom of the aperture in the latch member has a tooth which coacts with ratcheting teeth on the slider member. The coil spring urges the tooth of the latch member into engagement with the ratcheting teeth of the slider member and allows the latch member to be moved out of engagement with the slider member in response to a predetermined force. A temperature-responsive slug is disposed within the coil spring in parallel with the coil spring for allowing movement of the latch member in response to the predetermined force above a predetermined temperature but requires a higher force for moving the latch member at temperatures lower than the predetermined temperature.

8 Claims, 3 Drawing Figures

MOTION TRANSMITTING REMOTE CONTROL ASSEMBLY

BACKGROUND OF THE INVENTION (1) Field of the Invention

The subject invention relates to a motion transmitting remote control assembly of the type wherein motion is transmitted in a curved path by a flexible motion transmitting core element movably supported by a flexible conduit.

Such remote control assemblies normally include means adjacent each end of the conduit for attaching the conduit to a support structure with the core element extending from each end of the conduit. It is frequently desirable to adjust the length of the conduit to change the position of one end of the core element extending from the conduit once the assembly is installed. An example of such a situation is where a remote control assembly is utilized to interconnect the accelerator pedal and a throttle valve in an automobile. In this situation, the assembly is usually installed by attaching the conduit to the body of the automobile adjacent the accelerator pedal while attaching the end of the core element extending therefrom to the accelerator pedal. The opposite end of the conduit is attached to a support structure adjacent the carburetor so that the other or opposite end of the core element may be attached to the operating lever of the throttle valve. Frequently, however, the end of the core element adjacent the carburetor does not extend from the conduit a proper amount for attachment to the operating lever of the throttle valve. During such installation the accelerator pedal is in its unmoved or idle position as is the operating lever of the throttle valve and if the end of the core element adjacent the operating lever of the throttle valve is not positioned correctly, the operating lever of the throttle valve must be moved for attachment of the core element so that the end result is that the accelerator pedal is in the idle position but the operating lever of the throttle valve is not. The position of the end of the core element extending from the conduit, i.e., the distance the core element extends from the conduit, may be changed by altering the length of the path over which the conduit extends.

(2) Description of the Prior Art

There are assemblies known to the prior art wherein an adjustment in the length of the conduit may be accomplished in order to change the distance the core element extends from the end of the conduit during an installation procedure. One type of such assembly includes a support member adapted for attachment to a support structure with a slider member movably supported by the support member for longitudinal movement and connected to the end of the conduit whereby the conduit effectively changes in length as the slider member moves relative to the support member. The support member movably supports a locking or latching member which engages the slider member to control the longitudinal movement of the adjustment of the slider member relative to the support member. In other to provide for automatic adjustment of the length of the conduit, the slider member may ratchet relative to the latching member whereby once the assembly is installed, as in the environment described above, the accelerator pedal may be pushed to the full-throttle position placing the core element in tension to place a longitudinal force on the conduit whereby the slider member ratchets relative to the support member to the proper adjusted position. This installation procedure is normally performed in an ambient temperature condition in an automotive assembly line. However, the throttle control valve is also interconnected with the automatic transmission in an automobile and controls the shifting of the transmission which, in turn, transmits a force to the core element of the control assembly. Frequently, the force required between the throttle and the transmission to shift the transmission increases with a decrease in temperature. In other words, a decrease in temperature requires a greater force for shifting the transmission. Such a force has resulted in a force transmitted to the motion transmitting remote control assembly of sufficient magnitude to cause an undesired readjustment of the length of the conduit changing the adjusted relative positions between the accelerator pedal and the throttle control valve.

SUMMARY OF THE INVENTION

The subject invention relates to a motion transmitting remote control assembly of the type for transmitting forces along a curved path by a motion transmitting core element movably supported within a flexible conduit with the ends of the core element extending from the ends of the conduit. The assembly includes a support member with locking means engageable with the conduit for controlling the longitudinal movement of the conduit relative to the support member. Biasing means reacts between the support member and the locking means for urging the locking means into engagement with the conduit while allowing the locking means to be moved out of engagement with the conduit in response to a predetermined force. A temperature-responsive means reacts between the support member and the locking means in parallel with the biasing means for allowing movement of the locking means in response to the predetermined force in a predetermined temperature range and for requiring higher forces than the predetermined force at temperatures out of the predetermined temperature range.

PRIOR ART STATEMENT

The broad concept of accomplishing the automatic adjustment of the length of a conduit upon movement of the core element is illustrated in U.S. Pat. No. 3,662,617, granted May 16, 1972, in the name of William G. Bennett et al and U.S. Pat. No. 3,710,645, granted Jan. 16, 1973, in the name of William G. Bennett, both of which are assigned to the assignee of the subject invention. A more specific example of that concept is illustrated in U.S. Pat. No. 4,175,450, granted Nov. 27, 1979, in the name of William G. Bennett and assigned to the assignee of the subject invention. The latter patent discloses a system wherein the length of the conduit is automatically adjusted in response to a force on the core element by a slider member on the conduit ratcheting relative to a latch member biased into engagement with the slider member and movably supported by a support member. The latch member may be manually moved out of engagement with the slider member for manual adjustment of the length of the conduit. The latch member is biased into engagement with the slider member by a spring which holds the latch member in engagement with the slider member to prevent a change in length of the conduit when the conduit has been adjusted to the proper length.

All of the above-described prior assemblies have proven to be very satisfactory and well-suited for certain purposes; however, there is a need for a remote control assembly wherein the latching member is biased into the latched position with a predetermined force which is satisfactory for installation and automatic and/or manual adjustment of the length of the conduit but with a compensator to increase the force necessary to disengage the latching member in response to temperature changes.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
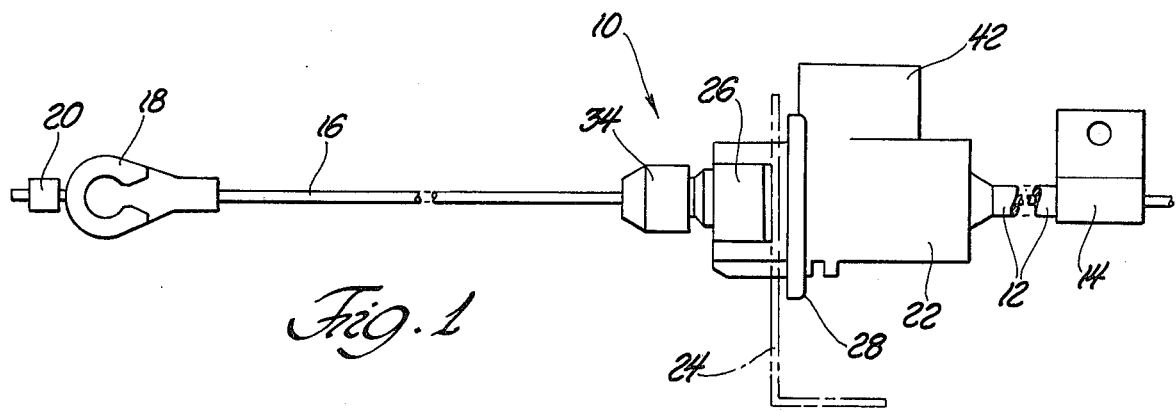
FIG. 1 is a side-elevational view of a preferred embodiment of the subject invention.

A motion transmitting remote control assembly constructed in accordance with the subject invention is generally shown at 10.

The assembly 10 includes a flexible conduit 12. The conduit 12 is preferably of the well-known type including an inner tubular member made of organic polymeric material and surrounded by a plurality of long-lay wires disposed helically thereabout with a casing of organic polymeric material disposed about the long-lay wires and about the inner tubular member. A fitting 14 is attached to one end of the conduit 12 and is adapted by a flange with a hole therein for attaching the conduit to a support structure, such as the body of a vehicle.

A flexible motion-transmitting core element 16 is movably supported by the conduit 12 with the ends of the core element extending from the ends of the conduit. The motion-transmitting core element 16 is a wire member, as illustrated, but also may comprise metal strands helically wound together in cable-like fashion. A coupling member or terminal 18 is disposed upon the end of the core element for attachment of the core element to an operated or operating member. A slug 20 retains the terminal member 18 upon the core element. The opposite end of the core element 16 may include a similar terminal as that shown at 18. The terminal member 18 is slidable along the core element 16 and includes a pocket for receiving the head of a pin, or the like, extending from an operated or operating member.

Figure 2:
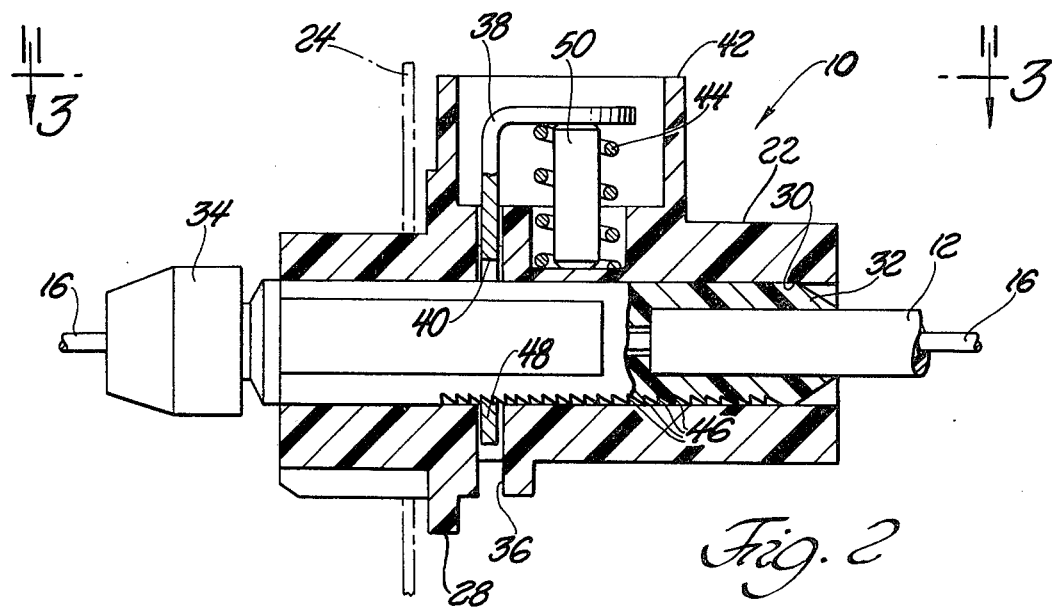
FIG. 2 is an enlarged cross-sectional view of a preferred embodiment of the subject invention.
Figure 3:
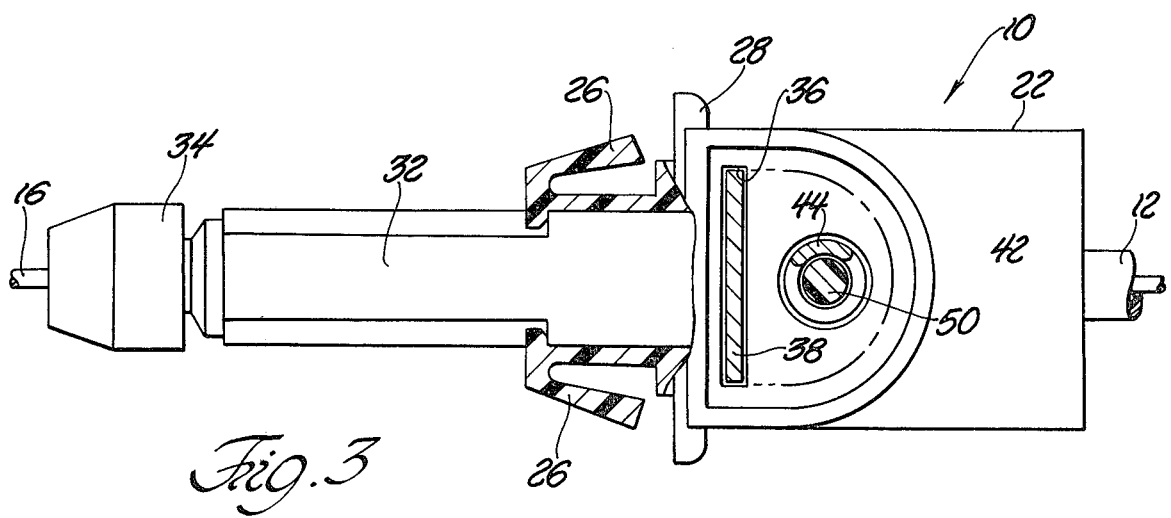
FIG. 3 is a plan view taken substantially along line 3—3 of FIG. 2 but partially broken away and in cross section.

The assembly also includes a support member 22 adapted for attachment to a support structure such as the supporting bracket 24 shown in phantom in FIGS. 1 and 2. The support member 22 is adapted for attachment to a support structure by snap-in means 26. The snap-in means 26 are inserted through an opening in a support member such as the bracket 24 to retain the support member 22 attached to the support bracket 24. Adjacent the snap-in means 26 is a flange 28 which forms a part of the support member 22. The snap-in means 26 may be of the type forming the subject matter of U.S. Pat. No. 3,427,894, granted to August E. Tschanz on Feb. 18, 1969, and assigned to the assignee of the subject invention.

The support member 22 includes a passageway 30 extending therethrough. The conduit 12 includes a slider member 32 slidably supported in the passageway 30. The slider member 32 is preferably of a rigid organic polymeric material molded about the plastic exterior of the conduit 12. The slider member 32 may take the configuration of the slider member specifically disclosed and described in U.S. Pat. No. 4,175,450, granted Nov. 27, 1979, to William G. Bennett and assigned to the assignee of the subject invention. A swiveling dust cover and/or core wiper 34 is supported through a swivel socket on the end of the slider member 32.

The support member 22 also includes a guideway 36 extending transversely to the passageway 30 and through the support member 22.

The assembly also includes locking means comprising a latch member 38 engageable with the slider member 32 of the conduit for controlling the longitudinal movement of the conduit relative to the support member 22. The latch member 38 is movably supported in the guideway 36 and has an aperture 40 therethrough with the slider member 32 extending through the aperture 40. The latch member 38 is L-shaped with the aperture 40 in one leg and the upper horizontally extending leg being disposed within and surrounded by a protective wall 42 which is integral with the support member 22. The wall 42 prevents inadvertent contact with the latch member 38.

The assembly also includes biasing means comprising the coil spring 44 reacting between the support member 22 and the the upper leg of the latch member 38 for urging the latch member into engagement with the slider member 32 of the conduit while allowing the latch member 38 to be moved out of engagement with slider member 32 in response to a predetermined force. The lower end of the spring 44 is disposed within a cavity in the support member 22 while its upper end engages the upper leg of the latch member 38.

Coacting ratcheting means comprising a plurality of teeth 46 on the slider member 32 and a tooth 48 defined by the lower edge of the aperture 40 in the latch member 38 are included for automatically allowing the conduit 12 to move longitudinally relative to the support member 22 in response to a predetermined longitudinal force applied to the conduit through the core element whereby the distance the core element extends from the conduit may be adjusted. As explained above, in certain situations where tension is placed upon the core element 16, a force will be applied to the conduit when in a tortuous path urging the conduit to shorten in length between its supports and in such a situation the slider member 32 will ratchet forwardly to an adjusted position. In addition, of course, the latch member 38 may be manually urged against the spring 44 to manually adjust the effective length of the conduit 12. Specifically, the teeth 46 and 48 have a ratcheting configuration for allowing movement of the slider member in one direction to the left, as illustrated in FIG. 2, relative to the support member 22 while engaged by the latch member 38 and preventing such movement in the opposite direction while engaged by the latch member 38 thereby effecting automatic ratcheting adjustment in the effective length of the conduit.

The assembly also includes a temperature-responsive means comprising an elongated slug 50 reacting between the support member 22 and the upper leg of the latch member 38 in parallel with the spring 44 for allowing movement of the latch member 38 in response to a predetermined force in a predetermined temperature range and for requiring higher forces to move the latch member 38 than the predetermined force at temperatures out of the predetermined temperature range. Specifically, the slug 50 would allow normal operation of the latch member 38 in a normal ambient temperature range but would offer greater resistance to the movement of the latch member as temperatures fall below that temperature range. By way of example, the slug 50 may have no effect upon the latch member 38 in its coaction with the spring 44 during assembly at an automotive plant to obtain the desired adjusted length of the conduit. However, should the automobile be subjected to cold temperatures which increase the forces necessary to be transmitted by the core element 16, the slug would become more resistive to require a greater force to move the latch member 38 thereby preventing automatic or inadvertent adjustment in the length of the conduit to an undesired position.

The slug 50 is disposed within the spring 44 and is spaced therefrom and is completely free of the spring 44 although retained therein in the operating position. The slug is made of a normally resilient organic polymeric material which increases in hardness with a decrease in temperature. As will be appreciated, the spring 44 and the slug 50 will be placed in compression upon disengaging movement of the latch member 38.

In one preferred embodiment the slug 50 was made of a polyacrylate having a durometer between 60 and 90.

All of the components except the core element 16 and the latch 38 and the spring 44 are preferably made of organic polymeric or plastic materials.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly of the type for transmitting forces along a curved path by a motion transmitting core element, said assembly comprising; a flexible conduit having opposite ends, a flexible motion transmitting core element movably supported by said conduit with the ends thereof extending from the ends of said conduit, a support member, locking means engageable with said conduit for controlling the longitudinal movement thereof relative to said support member, biasing means reacting between said support member and said locking means for urging said locking means into engagement with said conduit while allowing said locking means to be moved out of engagement with said conduit in response to a predetermined force, and temperature responsive means reacting between said support member and said locking means in parallel with said biasing means for allowing movement of said locking means in response to said predetermined force in a predetermined temperature range and for requiring higher forces than said predetermined force at temperatures out of said predetermined temperature range.

2. An assembly as set forth in claim 1 wherein said temperatures out of said predetermined temperature range are lower temperatures than those in said predetermined temperature range.

3. An assembly as set forth in claim 2 including coacting ratcheting means disposed on said locking means and said conduit respectively for automatically allowing said conduit to move longitudinally relative to said support member in response to a predetermined longitudinal force applied to said conduit through said core element whereby the distance said core element extends from said conduit is adjusted.

4. An assembly as set forth in claim 3 wherein said temperature responsive means is made of a normally resilient organic polymeric material which increases in hardness with a decrease in temperature.

5. An assembly as set forth in claim 4 wherein said biasing means comprises a coil spring and said temperature responsive means is disposed within said spring, said spring and temperature responsive means being disposed between said support means and said locking means to be placed in compression.

6. An assembly as set forth in claim 5 wherein said temperature responsive means comprises an elongated slug.

7. An assembly as set forth in claim 6 wherein said support member includes a passageway extending therethrough, said conduit including a slider member slidably supported in said passageway, said support member including a guideway extending transversely to said passageway and through said support member, said locking means comprising a latch member movably supported in said guideway and having an aperture therethrough with said slider member extending through said aperture, said coacting ratcheting means comprising a plurality of teeth on said slider member and a tooth defined by the lower edge of said aperture in said latch member, said latch member being L-shaped with said spring and slug engaging one leg and said aperture being in the opposite leg thereof.

8. An assembly as set forth in claim 7 wherein said tooth on said latch member and said teeth on said slider member having a ratcheting configuration for allowing movement of said slider member in one direction relative to said support member while engaged by said latch member and preventing such movement in the opposite direction while engaged by said latch member.

* * * * *